Sept. 11, 1951     H. J. MURPHY     2,567,891

THREE-SIDE LOCK SNAP FASTENER

Filed Dec. 30, 1948

Inventor

HOWARD J. MURPHY,

By John Todd

Attorney

Patented Sept. 11, 1951

2,567,891

UNITED STATES PATENT OFFICE 2,567,891

THREE-SIDE LOCK SNAP FASTENER

Howard J. Murphy, Lynnfield, Mass., assignor to United-Carr Fastener Corporation, Cambridge, Mass., a corporation of Massachusetts Application December 30, 1948, Serial No. 68,155

2 Claims. (Cl. 24—218)

This invention relates generally to snap fasteners, and has particular reference to a three-side lock snap fastener socket for use with a stud having a shank and an enlarged head thereon forming a sharp shoulder.

One of the major problems in constructing such fasteners is the difficulty of providing a suitable spring member in the socket to expand over the enlarged head of an inserted stud and engage the stud shank. The head of the stud must be sufficiently large to enable the spring to engage the stud behind the head to retain the stud firmly in the socket after assembly. However, if the head is too large, the spring member will be permanently distorted by expanding over the head during assembly, and thereafter will be unable to spring back to engage the stud shank. Hence it is seen that it is desirable to have a spring member which is capable of relatively great elastic expansion, to pass over the enlarged head of an inserted stud, but which has sufficient resiliency to retract to firmly engage the stud shank when the stud is fully inserted.

The principal object of the invention is to provide an improved snap fastener assembly in which the socket and cooperating stud member can be disengaged only by a separating force applied on one predetermined side of the assembly.

A further object of the invention is to provide a snap fastener socket having a spring member disposed therein, in which the spring member has a stud-engaging portion and means for providing greater elastic expansion to accommodate the head of an inserted stud than is provided by the stud-engaging portion alone.

A further object of the invention is to provide a three-side lock snap fastener socket having a stud-engaging spring member comprising a stud-engaging portion and a looped portion, in which the looped portion provides sufficient expansion of the stud-engaging portion to allow the stud-engaging portion to expand over the head of an inserted stud without permanent deformation of the spring member.

Other objects of the invention will, in part, be obvious and will, in part appear hereinafter. For a fuller understanding of the nature and objects of the invention, reference should be had to the following detailed description, taken in conjunction with the accompanying drawing, in which.

Figure 1:
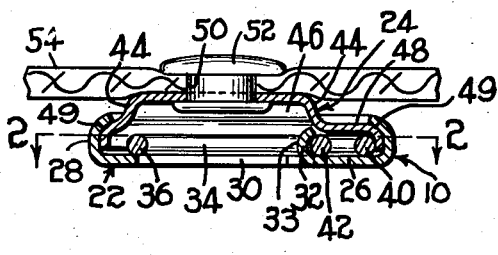
Fig. 1 is a view in elevation, partly in section, of a socket member embodying the features of the invention.
Figure 2:
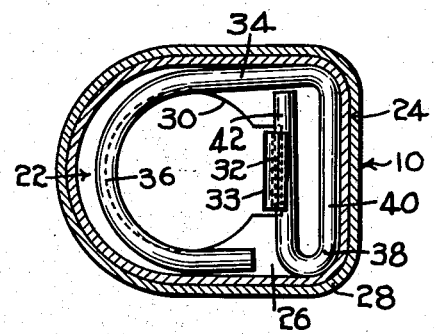
Fig. 2 is a view in section on line 2—2 of Fig. 1.

Referring to the drawing, there is illustrated a three-side lock fastener assembly, comprising a socket member 10 and a cooperating stud member 12. The stud 12 comprises a shank 14, having an enlarged head 16 disposed thereon, forming a shoulder 18. In the preferred form, the shoulder 18 is relatively flat, and substantially perpendicular to the axis of the shank. The stud is provided with the usual means for attachment to a supporting sheet 20. The socket 10 comprises a base member 22 and an attaching member 24 which are ordinarily formed of sheet metal. In the preferred embodiment the base member 22 has the form of a rectangle with a rounded end and the attaching member has a corresponding shape to fit therein. The base member 22 comprises a base portion 26 having an upstanding wall 28 disposed about the outer portion, and a stud-receiving opening 30 disposed in the base plate. A stud-retaining tab 32 is provided on one side of the opening and in the illustrated embodiment is formed by turning upwardly a portion of the base plate adjacent the opening. The tab 32 is shaped and arranged to engage the stud shoulder 18 of the inserted stud in non-locking relationship, so that the stud may become disengaged from the socket by a separating force applied to the assembly on the side of the socket having the stud-retaining tab. This is accomplished by providing the tab with an inclined or rounded shoulder portion 33 which is disposed to be adjacent the shoulder of an assembled stud.

A spring member 34 is disposed in the socket body, and comprises a stud-engaging portion 36 and a looped portion 38. The stud-engaging portion 36 is preferably in semi-circular form and is disposed about one side of the opening 30 to engage an inserted stud as will be hereinafter described. The looped portion 38 comprises an outer leg 40 which is an extension of the stud-engaging portion 36 and an inner free end portion 42 disposed behind the stud-retaining tab 32.

The attaching cap 24 comprises a sheet metal body having a peripheral wall 44 forming a stud head receiving cavity 46, and an extended portion 48 which is disposed to cover the looped portion 38 of the spring member 34 when the socket is assembled. To provide means for securing the attaching cap 24 to the base member, wall 44 of the attaching cap may be provided with a body-engaging shoulder 49. The attaching member 24 is also provided with an opening 50 to receive a rivet 52 or other device for attaching the socket to a supporting sheet 54.

To assemble the socket, the spring member 34 is placed in position in the base member 22 and the attaching member 24 is placed on the base member, and secured thereto by bending the walls 28 of the base member inwardly over the shoulder 49 of the attaching member.

Figure 3:
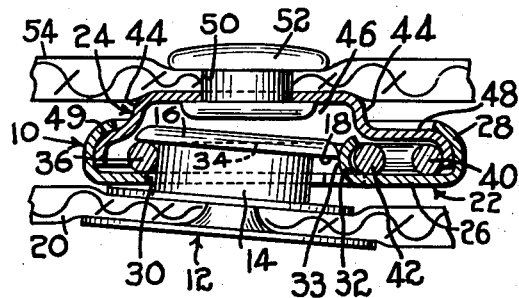
Fig. 3 is a view in elevation, partly in section, of the socket member and an assembled stud member, illustrating the method of removing the stud from the socket.
Figure 4:
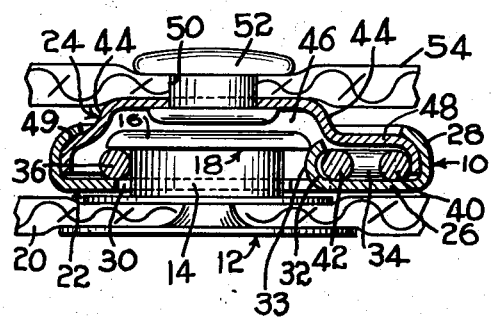
Fig. 4 is a view in elevation, partly in section, of the socket member and the stud member in the fully assembled position.

In operation, the stud is inserted into the socket in the conventional manner (see Fig. 3), thereby causing expansion of the stud-engaging portion 36 over the enlarged head 16, allowing the shoulder 18 to pass the stud-retaining tab 32, and engage the shoulder portion 33 of the tab when the stud is fully inserted. The stud-engaging portion of the spring snaps into engagement with the stud shoulder 18 thereby retaining the stud in engagement with the stud-retaining tab on the opposite side of the socket.

In the preferred embodiment, the stud shoulder 18 is so constructed as to allow the stud-engaging portion of the spring to seat thereon to prevent removal of the stud from the socket by a disengaging force applied on that side. However, the stud-retaining tab is shaped and arranged as hereinbefore described to permit the stud shoulder to become disengaged therefrom by a separating force applied on the side of the socket having the stud-retaining tab, thereby imparting the three-side lock feature to the assembly.

During insertion of the stud, the stud-engaging portion of the spring must expand elastically outwardly sufficiently far to allow the enlarged head of the stud to pass between the spring and the tab, and the spring must then contract to firmly engage the stud shank behind the shoulder. Movement of the stud-engaging portion of the spring outwardly is transmitted to the looped portion 38 of the spring, and flexes the outer leg 40 relative to the free end portion 42, thereby allowing the stud-engaging portion 36 greater movement in outward expansion than is provided by the expansion of the stud-engaging portion alone. By allowing this extra elastic expansion, permanent deformation of the spring member during insertion of the stud is prevented.

The socket member 10 may have any desired external shape, but if the socket is to be attached to a supporting material by an automatic machine, it is desirable that the shape of the socket body be other than symmetrical, as illustrated. This is to enable the feeding mechanism of the machine to suitably position the socket for attachment with the unlocking side of the socket in a predetermined direction in relation to the supporting sheet.

Since certain obvious changes may be made in the device without departing from the scope of the invention, it is intended that all matter contained herein be interpreted in an illustrative and not in a limiting sense.

I claim:
1. A snap fastener socket for use with a stud of the type having a shank and a shoulder formed by an enlarged head portion on the shank, the socket comprising a hollow body having an opening in one side thereof to receive a stud, a stud-retaining tab on one side of the opening extending within said hollow body and having a camming surface extending angularly outward with respect to the shank of an assembled stud, a spring member disposed in the body to engage the stud and including a looped portion disposed behind the stud-retaining tab and a semi-circular stud-engaging portion disposed about the opposite side of the opening with portions thereof projecting into the opening for engagement with an inserted stud, said semi-circular stud-engaging portion being adapted to expand outwardly over the enlarged head portion of an inserted stud and snap into engagement with the stud shank under said shoulder, said stud-engaging portion of the spring forcing an assembled stud against the stud-retaining tab with the camming surface thereof in engagement with an under portion of the shoulder on the stud, the engagement of said camming surface with said shoulder retaining the stud in position but allowing removal thereof by a disengaging force applied to the stud on that side.

2. A snap fastener socket for use with a stud having a shank and a shoulder formed by an enlarged portion on the shank, the socket comprising a hollow body having an opening therein to receive the stud, a stud-retaining tab extending into said body at one side of said opening and having a transversely rounded camming surface with its convex side disposed toward said opening, a spring member disposed in the body to engage the stud, said spring member comprising a looped portion disposed behind the stud-retaining tab and a semi-circular stud-engaging portion disposed about the opposite side of the opening with portions thereof projecting over said opening, said semi-circular stud-engaging portion being adapted to expand outwardly over the enlarged head portion of an inserted stud and snap into engagement with the stud shank behind the shoulder thereon, said stud-engaging portion of the spring forcing an assembled stud against the stud-retaining tab, the rounded camming surface of said stud-retaining tab facilitating insertion and removal of a stud into and from said socket and being adapted for engagement behind the shoulder of a stud to releasably retain it in assembled relation with the socket.

HOWARD J. MURPHY.

REFERENCES CITED

The following references are of record in the file of this patent:

UNITED STATES PATENTS

| Number | Name | Date |
| --- | --- | --- |
| 1,234,359 | McCormack | July 24, 1917 |